No. 891,512. PATENTED JUNE 23, 1908.
E. O. WHEELOCK.
NUT LOCK.
APPLICATION FILED JULY 28, 1905. RENEWED MAY 12, 1908.
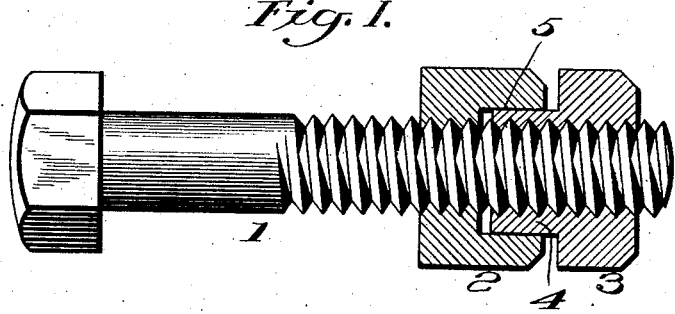
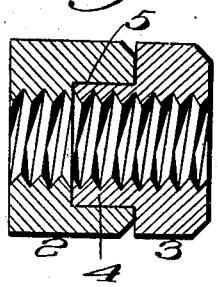 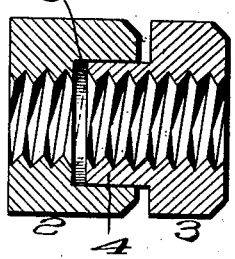
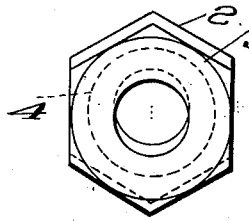 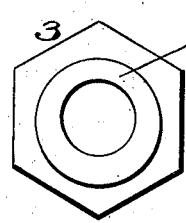 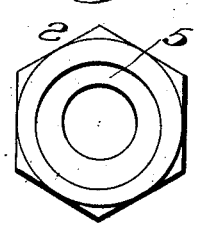 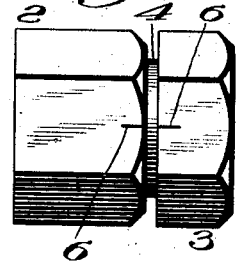
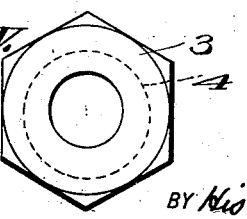
WITNESSES:
INVENTOR
Ernest O. Wheelock
BY his ATTORNEY
Alfred Wilkinson

UNITED STATES PATENT OFFICE.

ERNEST O. WHEELOCK, OF CHICAGO, ILLINOIS.

NUT-LOCK.

No. 891,512.     Specification of Letters Patent.     Patented June 23, 1908.

Application filed July 28, 1905, Serial No. 271,570. Renewed May 12, 1908. Serial No. 432,447.

*To all whom it may concern:*

Be it known that I, ERNEST O. WHEELOCK, citizen of the United States, residing at Chicago, in the county of Cook and State of Illinois, have invented certain new and useful Improvements in Nut-Locks; and I do hereby declare the following to be a full, clear, and exact description of the invention, such as will enable others skilled in the art to which it appertains to make and use the same.

My invention relates to nut-locking devices, and consists in a means of new construction, operating on a new principle, whereby the nut is maintained in position on its bolt, without danger of accidental loosening.

The essential features are a main nut and a lock-nut so formed that when arranged together and in contact to be screwed on the bolt, their threads do not register, that is, are not continuous. Preferably one nut is provided with a shank eccentric to its hole, and the other nut with a corresponding eccentric socket to receive said shank. When the nuts are arranged in contact so that their holes register, their threads are not continuous and are preferably about one half of the pitch apart, that is, the thread of the lock-nut begins at about the opposite side of the nut from the point on the main nut at which the thread of the latter terminates, whereby it results that, when the nuts are set together and screwed on the bolt, at first they are rotated and move upon the bolt as one nut, but when the bolt has passed through the main nut, it will not engage with the thread of the lock-nut until it has pushed the latter away from the main nut a space equal to about one half of the screw pitch. Therefore when the main nut has finally been turned home, the lock-nut may be set up this space or distance before its inner face engages again with the outer face of the main nut, and, therefore, without mutilating or stripping the thread. But what does occur is that in turning the lock-nut home or toward the main nut, the eccentric shank of one turns in the eccentric socket of the other, and as that movement begins, the holes at once are changed from their registering position and the bolt itself is bent, so that, when the lock-nut has been given the possible one half turn or even much less, an absolute lock is effected and the nuts can never jar, or become loose from any accident or vibration, it requiring considerable force to turn back the lock-nut, and, at the same time, bend the bolt back straight. If the lock-nut is so turned back to its original position, both nuts may be removed and used again if desired; also the bolt whose thread has not been mutilated.

I am aware that nuts formed merely with the eccentric shank and socket have been used, but that is something essentially different from my invention and operating in an entirely different way, for, without the special arrangement of threads on the respective nuts, the eccentric construction would only operate to give greater frictional surfaces in contact to prevent unlocking and the lock-nut would operate merely as a jam nut, it being possible to set it up a short distance only as in case of a jam nut, with a tendency to strip the thread at once. Whereas in my invention the lock-nut effects a positive lock and does not act as a jam nut or check nut, for, in ordinary operation, it does not, and need not, engage with the main or securing nut, or even touch said main nut, except on the surfaces of the shank and socket, that is, on these eccentric surfaces.

My invention will be understood by reference to the drawing herewith, in which the reference numerals of the specification indicate the corresponding parts in all the figures.

Figure I shows the bolt in elevation and the nuts in section, to illustrate the separated position of the latter in which their threads are continuous. Figs. II and III are cross sections of the nuts showing them respectively set in contact and separated. Figs. IV and V are face views of the nuts showing them with the holes registering, and not registering respectively. Figs. VI and VII are face views of the nuts operated to show the eccentric shank on one end and the eccentric socket on the other. Fig. VIII is a side elevation of the nuts separated, and set with their holes to register.

In the figures, 1 indicates the bolt, 2 the main nut and 3 the lock-nut. In one position the nut holes register, and means must be provided by which one nut may be turned on the other and the holes changed from straight registration to irregular or broken registration. To this end either nut may be provided with an eccentric shank and the other with a corresponding socket.

As here shown, the lock-nut has the eccentric shank 4 and the main nut the eccentric circular socket 5 adapted to receive the shank. Preferably external indicating marks 6 are placed on the two nuts to indicate the position in which they should be set to bring their holes in registering position. These marks are important to save trouble in arranging the two nuts, and to insure a correct position thereof.

The parts of my invention are simple to make and very effective and successful in practical operation, being adapted for use with devices of large or small size. Even the largest bolts may be so bent as to lock the main nut securely. With large devices it is in some cases desirable to oil the eccentrics to insure easy turning.

Having thus described my invention, what I claim as new and desire to secure by Letters Patent, is:—

1. In a nut-locking device, the combination with a bolt of usual construction, of a main nut and a lock-nut fitted to the bolt, the threads of said nuts being so arranged as not to be continuous when the nuts are in contact, and means whereby the lock-nut may be turned on the main nut and their holes shifted from a registering to a non-registering position.

2. In a nut-locking device, the combination with a threaded bolt, of a main nut and a lock-nut, one nut being provided with an eccentric, circular shank fitting a corresponding, eccentric socket on the other nut, the threads of said nuts being so arranged as not to be continuous, when the nuts are arranged with their holes registering.

3. In a nut-locking device, the combination with a bolt, of a main nut and a lock-nut, the lock-nut having an eccentric shank fitting an eccentric socket on the main nut, the thread on said lock-nut being arranged to begin at about the opposite side of the nut from the ending of the thread on the main nut, whereby the two nuts cannot be turned up together on the bolt, without separation.

4. In a nut-locking device, a main nut and a lock-nut provided one with an eccentric shank around its hole fitting a corresponding eccentric socket on the other, the nut threads being so arranged that they are not continuous when the nuts are set in contact with their holes registering, whereby the nuts must be separated a substantial space when being turned up on the bolt.

In testimony whereof I affix my signature in presence of two witnesses.

ERNEST O. WHEELOCK.

Witnesses:
  L. PETTOLETTI,
  JULIUS HABERMANN.